(12) United States Patent
Wilfert

(10) Patent No.: US 6,206,031 B1
(45) Date of Patent: Mar. 27, 2001

(54) REDUCED LENGTH PRESSURE COMPENSATING LIQUID FLOW REGULATOR

(75) Inventor: Russell Dean Wilfert, Chandler, AZ (US)

(73) Assignee: NMB (USA), Inc., Chatsworth, CA (US)

( * ) Notice: Subject to any disclaimer, the term of this patent is extended or adjusted under 35 U.S.C. 154(b) by 0 days.

(21) Appl. No.: 09/482,796

(22) Filed: Jan. 13, 2000

(51) Int. Cl.$^7$ ........................................................ G05D 7/01
(52) U.S. Cl. .................................................. 137/504
(58) Field of Search .............................................. 137/504

(56) References Cited

U.S. PATENT DOCUMENTS

| | | | |
|---|---|---|---|
| 3,120,243 | * 2/1964 | Allen et al. | 137/504 |
| 3,805,824 | * 4/1974 | Robbins, Jr. | 137/504 |
| 4,921,547 | * 5/1990 | Kosarzecki | 137/115.09 |
| 5,251,655 | * 10/1993 | Low | 137/501 |

OTHER PUBLICATIONS

Pp. C16 through C19 from The Lee Company Technical Hydraulic Handbook, 1997 Release 10.1.

* cited by examiner

*Primary Examiner*—Stephen M. Hepperle
(74) *Attorney, Agent, or Firm*—Amster, Rothstein & Ebenstein

(57) ABSTRACT

A reduced length, pressure compensating liquid flow regulator includes a poppet defining a longitudinally extending hollow cylinder having a front sense orifice and a rear orifice. A retainer maintains a biasing spring disposed at least partially within the cylinder, the retainer including a front sidewall defining a central aperture and a rear sidewall surface defining rear side slots, the retainer front sidewall forming an annular space between the cylinder rear orifice and the retainer front sidewalls. A seat has a closed front face spaced from and facing the cylinder, side passages rearwardly of the seat front face, and a downstream passage. The biasing spring biases the cylinder rear orifice longitudinally away from the seat. A hollow housing slidably receives the cylinder and fixedly receives the retainer means and the seat, the housing directing liquid flow from the retainer side slots into the seat side passages. The magnitude of the spacing between the seat front face and the cylinder rear orifice is self-adjusting as an inverse function of the magnitude of the flow rate, thereby to provide a substantially constant flow rate through the regulator by compensating for variations in the pressure differential across the sense orifice.

11 Claims, 4 Drawing Sheets

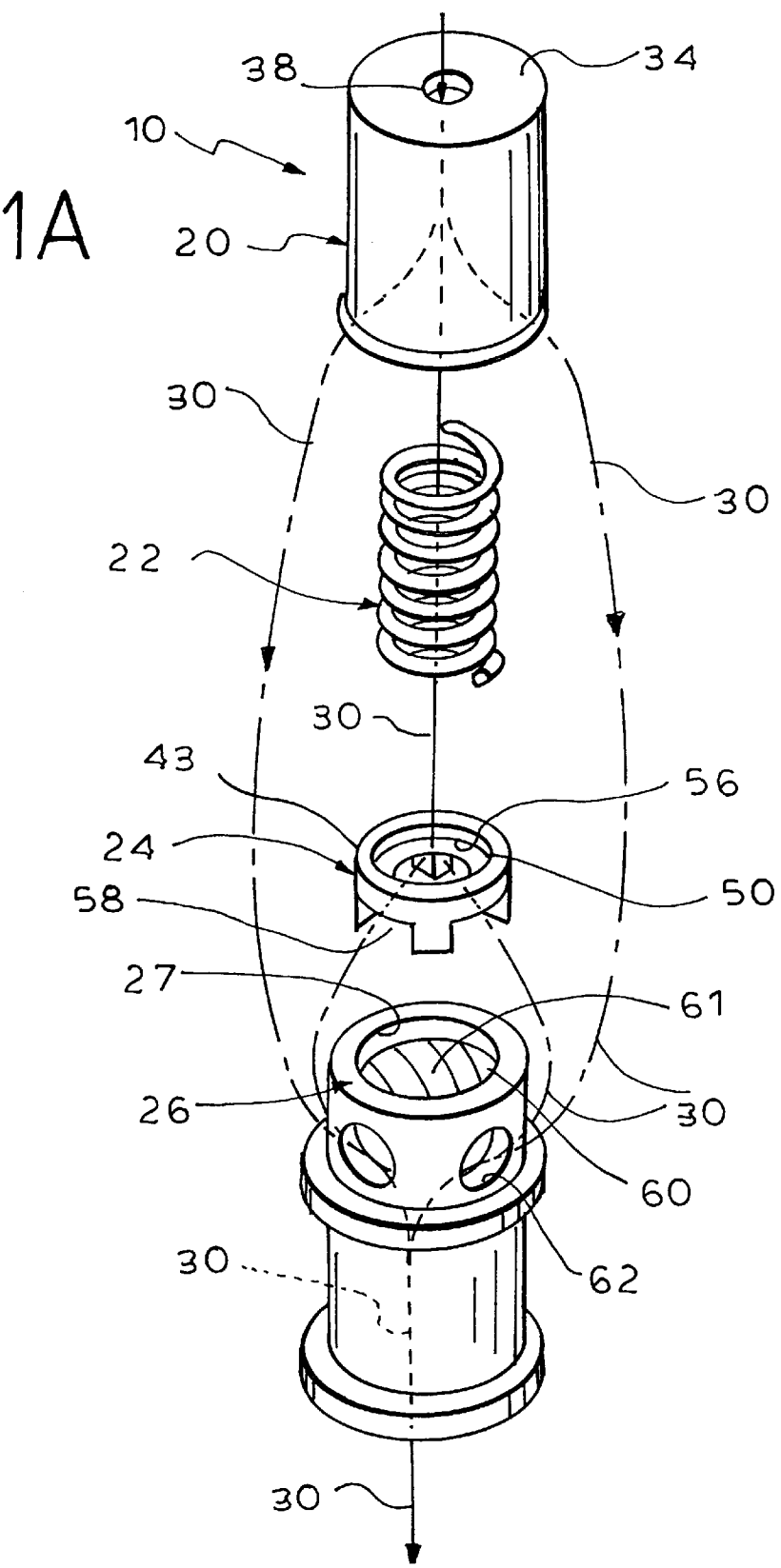

REDUCED LENGTH PRESSURE COMPENSATING LIQUID FLOW REGULATOR

BACKGROUND OF THE INVENTION

The present invention relates to a pressure compensating liquid flow regulator, and more particularly to such a regulator which is of reduced length.

The prior art teaches a liquid flow regulator which controls hydraulic flow to a predetermined level, regardless of the differential pressure across the regulator. For example, such a flow regulator is available under the tradename 500 Flosert from the Lee Company of Westbrook, Conn. The product maintains hydraulic flow at a predetermined level, regardless of the differential pressure across the regulator, by maintaining a constant pressure drop across a fixed or sensing orifice. The spring or biasing means of the flow regulator is disposed outside of the metering poppet, thus limiting the utility of the regulator in situations affording only a limited axial length for the regulator. For example, a slot for a flow regulator may have an installation bore length of less than 1 inch, while an installation bore length in excess of 2 inches is required for the prior art regulator. Accordingly, it would be desirable to have a flow regulator having an installation bore length of less than 1 inch (about half of the installation bore length of the prior art regulator), and preferably no more than 0.9 inch.

The prior art flow regulator did not prove to be entirely satisfactory in use because it could not regulate the liquid flow to a sufficiently tight range to be useful for particularly demanding customer applications. Thus whereas the prior art device regulated flow to about ±10%, critical applications require regulation of the flow to about ±3% (less than a third of the variation of the prior art regulator), and preferably no more than ±0.7%.

Accordingly, it is an object of the present invention to provide a educed length, pressure compensating liquid flow regulator.

Another object is to provide such a regulator having an installation bore length of less than 1 inch, and preferably no more than 0.9 inch.

A further object is to provide such a regulator which can regulate flow to about ±3%, and preferably no more than ±0.7%.

It is also an object of the present invention to provide such a flow regulator which is simple and economical to manufacture, maintain and use.

SUMMARY OF THE INVENTION

It has now been found that the above and related objects of the present invention are obtained in a reduced length, pressure compensating liquid flow regulator comprising a poppet, a retainer means, a seat, a biasing means and a housing. The magnitude of the spacing between the seat front face and the cylinder rear orifice is self-adjusting as an inverse function of the magnitude of the liquid flow rate, thereby to provide a substantially constant liquid flow rate through the regulator by compensating for variations in the pressure differential across the sense orifice.

More particularly, a poppet defines a longitudinally extending hollow cylinder having a front surface defining a front sense orifice and a rear surface defining a rear orifice, the cylinder orifices defining a liquid passageway therethrough. A retainer means maintains biasing means disposed at least partially within the cylinder, the retainer means including a front sidewall surface defining a central aperture and a rear sidewall surface defining rear side slots. The retainer central aperture and side slots define a liquid passageway therethrough. A seat has a closed front face spaced from and facing the cylinder, side passages rearwardly of the seat front face, and a downstream passage, the seat passages defining a liquid passageway therethrough. A biasing means disposed at least partially within the cylinder biases the cylinder rear orifice longitudinally away from the seat, the biasing means defining a liquid passageway therethrough. A hollow housing slidably receives the cylinder and fixedly receiving the retainer means and the seat, the housing directing liquid flow from the annular space and the retainer side slots into the seat side passages.

Preferably the retainer means slidably maintains the biasing means disposed entirely within the cylinder, the seat front face is flat, and the outer circumferences of the cylinder rear surface and the cylinder front surface are substantially equal.

In a preferred embodiment, the surface areas defined by the outer diameters of the poppet front surface and the poppet rear orifice, respectively, are substantially equal. Thus, the pressure differential between the poppet front and rear surfaces is substantially proportional in magnitude to the force exerted by the biasing means per unit of the substantially equal surface areas. Preferably the pressure differential is substantially equal in magnitude and opposite in direction to the force exerted by the biasing means per unit of the substantially equal surface areas.

Preferably the cylinder rear surface and the retainer front sidewall surface form an outwardly tapered annular space therebetween.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing, wherein:

FIG. 1A is an exploded isometric view, from the top and one side, of a flow regulator according to the present invention;

DETAILED DESCRIPTION OF THE PREFERRED EMBODIMENTS

Briefly, the pressure-compensating liquid flow control valve or regulator channels high speed liquid flow through the restrictor of a biased poppet, thereby creating a differential pressure across the poppet. The resulting force produced by the differential pressure moves the biased poppet against the biasing means and reduces the entrance or metering area into a valve, thereby reducing the pressure differential across the restrictor. Thus, the differential pressure is controlled across the restrictor, thereby maintaining a constant liquid flow regardless of the inlet pressure of the flow delivered to the regulator.

Figure 1B:
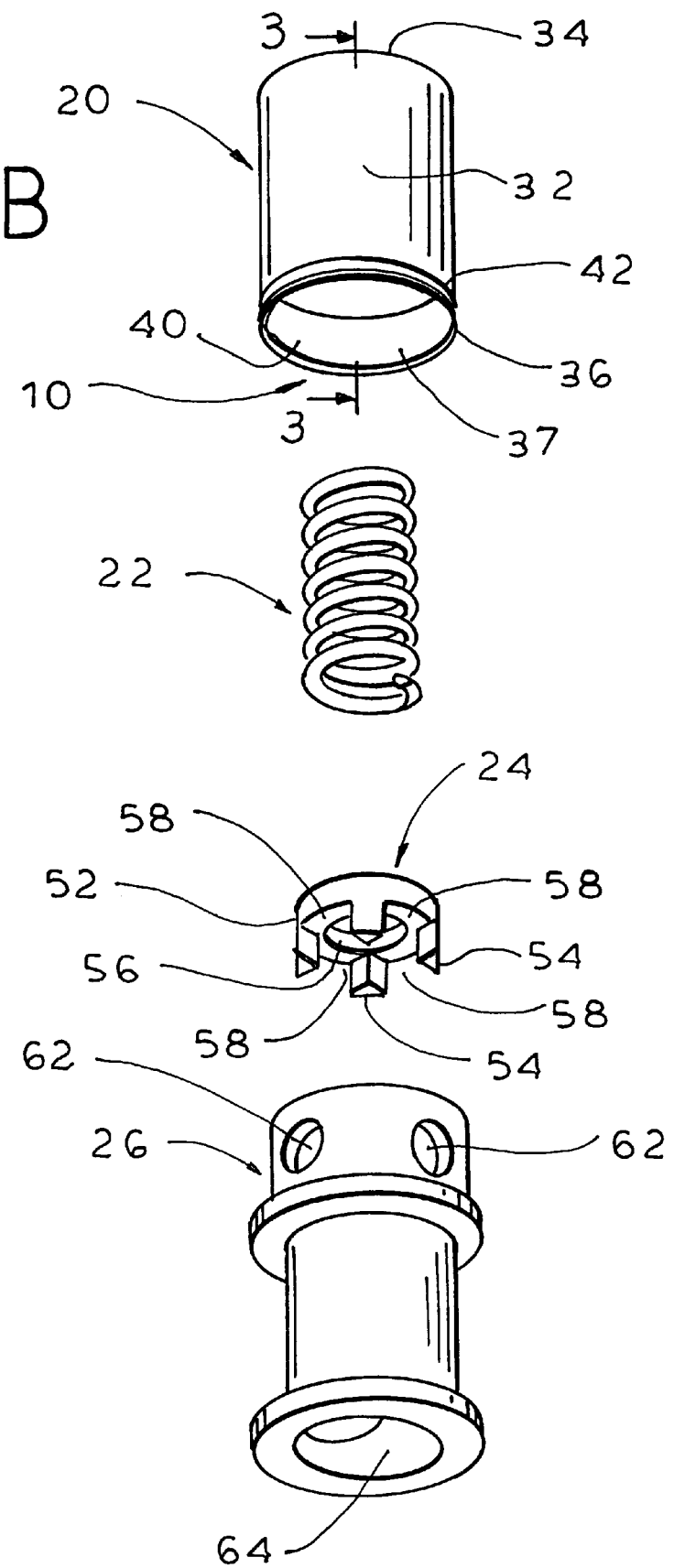
FIG. 1B is a view similar to FIG. 1A, but taken from the bottom and the opposite side of the flow regulator.

Referring now to the drawing, and in particular to FIGS. 1A and 1B thereof, therein illustrated is a flow regulator according to the present invention, generally designated by the reference numeral 10. As illustrated, the flow regulator 10 comprises a poppet generally designated 20, a biasing means generally designated 22, a retainer generally designated 24, a seat generally designated 26 and a housing generally designated 28 (the housing being best seen in FIG. 2). Fluid flow through the regulator is indicated by the arrows 30 of FIG. 1. Each of the above-mentioned components of the flow regulator 10 will now be described in further detail.

Figure 2:
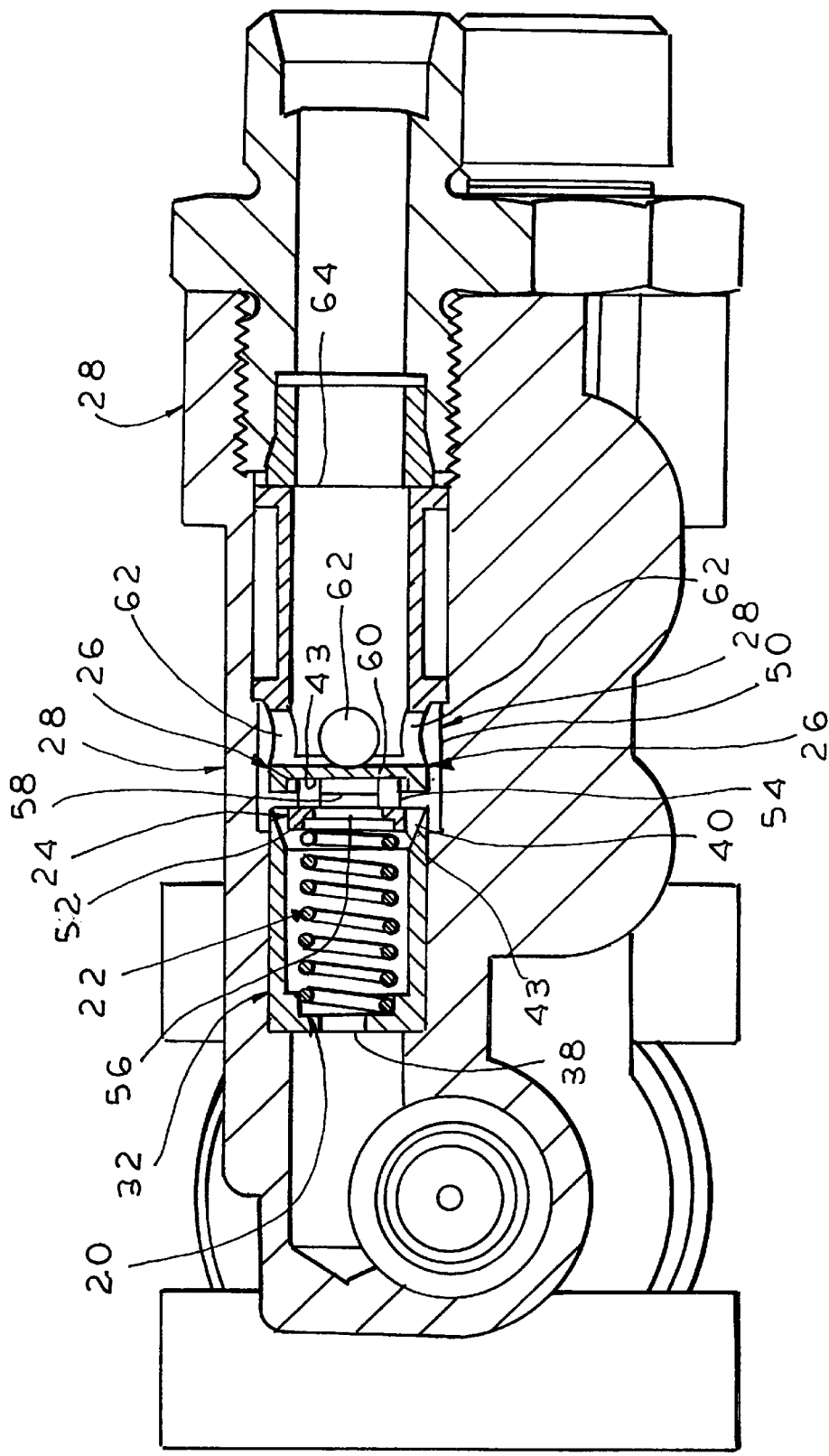
FIG. 2 is a sectional view of an assembled flow regulator.
Figure 3:
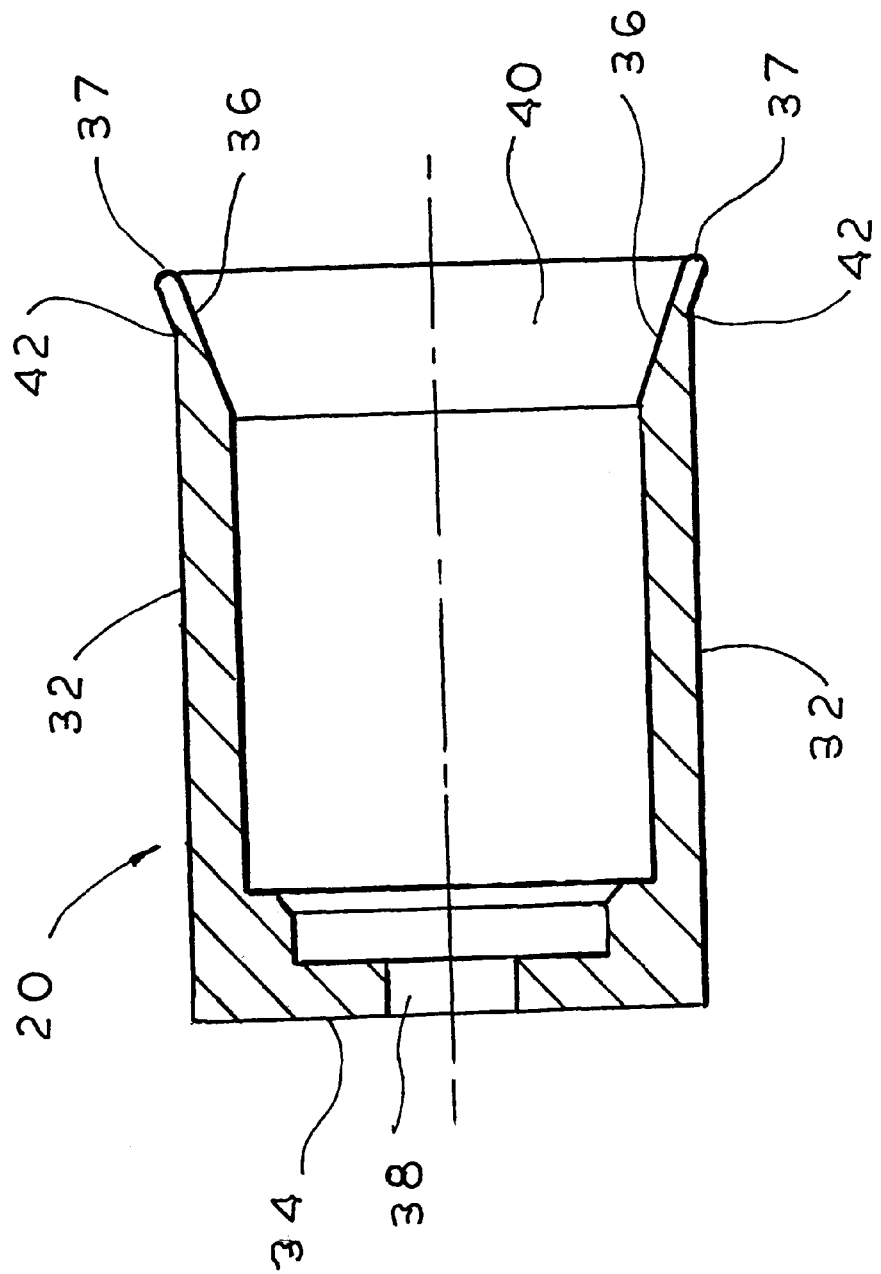
FIG. 3 is a sectional view of the poppet, taken along the line 3—3 of FIG. 1B.

The poppet 20, best seen by itself in FIG. 3, is a longitudinally extending hollow cylinder 32 having a front or upstream surface 34 and a rear or downstream surface 36. The front surface 34 is closed except for a front sense orifice 38 defined thereby, while the rear surface 36 is substantially open and defines the circumferential edge 37 of a rear orifice 40. The cylinder orifices 38, 40 define a fluid passageway through the poppet 20. The front sense orifice 38 acts as a flow restrictor so that, considering the poppet 20 alone, the hydraulic flow therethrough results in a lower pressure on the projected area enclosed by rear orifice 40 than on the front surface 34. (The "upper" and "lower" refers to the poppet orientation in FIGS. 1A and 1B and corresponds to the "left" and "right", respectively of the poppet orientation in FIGS. 2 and 3.). For reasons having to do with the facilitation of poppet production, the rear surface 36 may be formed with a narrow outwardly extending lip 42 which is not considered part of the poppet for pressure calculations. As best seen in FIGS. 2 and 3, the rear of the cylinder front face 34 is provided with a shoulder for centering into proper location the front of spring biasing means 22.

By way of example only, a poppet 20 having a total axial or bore length of 0.585 inches and a substantially constant outer diameter (excluding only the lip 42) of 0.4060 inch may have a front sense orifice 38 with a diameter of 0.1040 inch, a rear orifice 40 having a maximum of 0.4090 inch and a taper length of 0.085 inch. A flow regulator 10 having such a poppet 20 can typically regulate liquid flow rates to 2.80±0.02 gallons per minute for pressure differentials of 200 to 860 psid (pounds per square inch differential).

Referring now to FIGS. 1A–2 in particular, the retainer 24 is configured and dimensioned to maintain the biasing means or spring 22 disposed at least partially within the cylinder 32. As best seen in FIG. 2, the front 43 of retainer 24 has a forwardly extending lip, thereby to define a shoulder for centering into proper location the rear of spring biasing means 22. Thus, movement of the spring 22 is constrained and centered by the rear of the cylinder front surface 34 at one end and the front of the retainer front 43 at the other end. The rear of cylinder front surface 34 and the front of retainer front 43 trap the spring 22 therebetween while still permitting sliding movement of poppet 20. Preferably the spring 22 is maintained entirely within the cylinder 32 by the retainer 24—that is, both ends of spring 22 (and possibly at least the front surface of retainer 24) are disposed within the cylinder 32.

The retainer 24 includes a front or upstream sidewall surface 52 and a rear or downstream sidewall surface 54. The front sidewall surface 52 defines a central aperture 56 therethrough, and the rear sidewall surface 54 defines rear side slots 58 therethrough. The central aperture 56 and the side slots 58 cooperatively define a fluid passage through the retainer 24, while the retainer front sidewall surface 52 forms with the taper of the cylinder rear orifice 40 an annular space between the retainer 24 and cylinder 32. Thus the retainer 24 not only provides a pedestal on which the spring 22 may sit, but also defines various fluid passageways therethrough.

In order to ensure the absence of interference and/or frictional binding between the outer circumference of the retainer 24 and the inner circumference of the cylinder rear orifice 40, the cylinder rear surface 36 preferably defines an inward taper from orifice 40 (for example, at about a 20° angle) adjacent the downstream end of the cylinder 32. Such inward taper from rear orifice 40 is unnecessary when alternative means are used to preclude interference and/or frictional binding of the cylinder orifice 40 and the retainer front 43. The actual volume of liquid flow through the annulus (formed between the inward taper from cylinder rear orifice 40 and the front end of retainer 24) is relatively minor compared with the volume of the flow through the retainer central aperture 56.

Still referring now to FIGS. 1A–2 in particular, the seat 26 has a closed front face 60 and a closed counterbore bottom 61 (seen in FIGS. 1A and 2) spaced from and facing the cylinder 32 (and in particular the rear surface 36 of cylinder 32). It also defines, rearwardly of the seat closed front face 60, a plurality of circular side passages 62 and at least one downstream passage 64. The downstream passage 64 may be centrally disposed and aligned with the liquid flow entering the regulator 10, as illustrated, or it may be disposed on a sidewall of the seat 26 downstream of the closed front face 60 and side passages 62. The side passages 62 enable liquid flow into the hollow of the seat 26, downstream of the closed front face 60, while the downstream passage allows the liquid flow out of the hollow of seat 26. Accordingly, the side passages 62 and downstream passage 64 cooperate to define a liquid passage through the seat 26. The seat front face 60 is preferably flat.

The seat 26 is preferably formed with a counterbore 27 in the closed front surface 60 leading to the closed counterbore bottom 61, so that the lower sidewall portions 54 of the retainer 24 are centered in and snugly retained by the counterbore. In any case, under the influence of spring 22, retainer 24 is strongly biased against seat 26. Referring now to FIG. 2 in particular, the housing 28 is hollow and slidably receives the cylinder 32 (and indeed the entire poppet 20) therein while fixedly receiving seat 26 and retainer 24 therein. The housing 28 has the crucial function of directing liquid flow emerging from the retainer side slots 58 (via retainer central aperture 56) and the annular space (between the cylinder rear orifice 40 and the retainer front sidewall surface 52) into the seat side passages 62.

The magnitude of the spacing between the seat front face 60 and the cylinder edge 37 defining cylinder rear orifice 40 is self-adjusting to be an inverse function of the magnitude of the liquid flow rate, thereby to provide a substantially constant liquid flow rate through the regulator 10 by compensating for variations in the pressure differential across the sense orifice 38 of the poppet front surface 34.

The inner circumference of the cylinder rear surface 36 and the outer circumference of the cylinder front surface 34 are preferably substantially equal (the additional surface of the lip 42 being of little consequence). More particularly, the projected surface areas enclosed by the circumference of the poppet front surface 34 and the circumference of edge 37 (defining poppet rear orifice 40), respectively, are substantially equal. Thus, the pressure differential between the poppet front and rear surfaces 34, 36 is substantially proportional in magnitude to the force exerted by the biasing means 22 per unit of the substantially equal surface areas. Preferably the pressure differential is substantially equal in magnitude and opposite in direction to the force exerted by the biasing means 22 per unit of the substantially equal surface areas.

It will be appreciated by the mathematically inclined that the use of substantially equal surface areas for the poppet front surface 34 and the poppet rear surface 36 simplifies the calculation of the appropriate spring force to be used. This area balance ensures that poppet position is only dependent on this internal pressure differential, and not on inlet and outlet pressures as well.

The present invention allows the flow regulator to have a length of less than 1 inch, and typically no more than 0.9 inch, and to provide a flow regulation to within ±3%, and typically as low as ±0.7%.

As will be apparent to those skilled in the art, all components of the flow regulator exposed to the fluid flow must be formed of materials which are substantially inert to the fluid flow. All of the components are preferably substantially rigid to maintain important tolerances, except for the spring or biasing means which is preferably formed of a stainless steel material of appropriate biasing strength.

As best seen in FIG. 2, the metering area of the flow regulator 10 is the surface of a hypothetical cylinder formed from the inner circumference or edge 37 of cylinder 32, as it is this area which controls the magnitude of the liquid flow from the cylinder 32 and retainer 24 radially outwardly and into the seat 26. As the pressure differential increases, the metering area is diminished because of the downstream movement of the poppet 20 relative to the fixed seat 26, and as the pressure differential decreases, the metering area is increased because of the upstream movement of the poppet 20 relative to the fixed seat 26 under the influence of spring 22.

The diametric clearance between the poppet 20 and the housing 28 is preferably maintained within a range which minimizes bypass leakage while allowing smooth poppet motion along the regulator longitudinal axis without binding. Also, each of the flow passages should be sufficiently large, compared to the sense orifice 38 and the metering area to minimize pressure losses that could adversely impact valve function. In order to obtain a desired differential pressure area balance, the diameter of the metering area is preferably only very slightly larger than the outside diameter of the poppet 20.

As best seen in FIG. 1A, in operation hydraulic (liquid) flow is routed through the sense orifice 38 of poppet cylinder 32, through the center of the coil spring 22. It then proceeds through the center aperture 56 of the retainer front sidewall 52 and then the side slots 58 of the rear sidewall surface 54, or, in a preferred embodiment, also through the annulus between the cylinder tapered surface from rear orifice 40 of cylinder 32 and the retainer forward sidewall surface 52. The hydraulic flow is next channeled by housing 28 into the seat side passages 62, finally exiting through the seat downstream passage 64.

As the hydraulic flow passes through the sense orifice 38, it creates an internal differential pressure (between the front and rear of cylinder front surface 34). This internal differential pressure acts upon the area-balanced poppet 20. If hydraulic flow increases slightly above the set point, the differential pressure increases, thereby producing a greater downstream-directed force on the poppet 20 which overcomes the upstream-directed bias of spring 22, thereby moving the poppet 20 downwardly and reducing the metering area. Since the metering area is thus reduced, the hydraulic flow (and therefore the differential pressure) is also reduced. If hydraulic flow decreases slightly below the set point, the differential pressure decreases, thereby producing a lesser downstream-directed force on the poppet 20 than the upstream-directed bias spring 22, thereby moving the poppet 20 upwardly and increasing the metering area. Since the metering area is thus increased, the hydraulic flow (and therefore the differential pressure) is also increased. In this manner, a force balance is maintained between the differential pressure acting on the poppet 20 and the force exerted by the spring 22, thus resulting in a nearly constant differential pressure. The constancy of this differential pressure (as maintained across the fixed sense orifice 38) insures that a constant flow rate is maintained.

The spring 22 is preferably disposed entirely within the poppet cylinder 32 in order to provide the most dramatic reduction in length of the flow regulator.

To summarize the present invention provides a reduced length, pressure compensating liquid flow regulator. The regulator has an installation bore length of less than one inch, and preferably no more than 0.9 inch (less than half that of the prior art regulator) and a flow regulation of about ±3%, and preferably no more than ±0.7% (less than a third of the variation of the prior art regulator). The regulator is simple and economical to manufacture, use and maintain.

Now that the preferred embodiments of the present invention have been shown and described in detail, the various modifications and improvements thereon will become readily apparent to those skilled in the art. Accordingly, the spirit and scope of the present invention is to be construed broadly and limited only by the appended claims, and not by the foregoing specification.

I claim:

1. A reduced length, pressure compensating liquid flow regulator, comprising:
   (A) a poppet defining a longitudinally extending hollow cylinder having a front surface defining a front sense orifice and a rear surface defining a rear orifice, said cylinder orifices defining a liquid passageway therethrough;
   (B) retainer means for maintaining biasing means disposed at least partially within said cylinder, said retainer means including a front sidewall surface defining a central aperture and a rear sidewall surface defining rear side slots, said retainer central aperture and side slots defining a liquid passageway therethrough;
   (C) a seat having a closed front face spaced from and facing said cylinder, side passages rearwardly of said seat front face, and a downstream passage, said seat passages defining a liquid passageway therethrough;
   (D) biasing means disposed at least partially within said cylinder for biasing said cylinder rear orifice longitudinally away from said seat, said biasing means defining a liquid passageway therethrough; and
   (E) a hollow housing slidably receiving said cylinder and fixedly receiving said retainer means and said seat, said housing directing liquid flow from said annular space and said retainer side slots into said seat side passages; whereby the magnitude of the spacing between said seat front face and said cylinder rear orifice is self-adjusting as an inverse function of the magnitude of the liquid flow rate, thereby to provide a substantially constant liquid flow rate through said regulator by compensating for variations in the pressure differential across said sense orifice.

2. The regulator of claim 1 wherein said retainer means maintains said biasing means disposed entirely within said cylinder.

3. The regulator of claim 1 wherein said cylinder rear orifice and said retainer front sidewall surface form an outwardly tapered annular space therebetween.

4. The regulator of claim 1 wherein said retainer means slidably maintains said biasing means at least partially within said cylinder.

5. The regulator of claim 1 wherein the outer circumferences of said cylinder rear surface and said cylinder front surface are substantially equal.

6. The regulator of claim 1 wherein the surface areas defined by the outer diameters of said poppet front surface and said poppet rear orifice, respectively, are substantially equal.

7. The regulator of claim 6 wherein the pressure differential between said poppet front and rear surfaces is substantially proportional in magnitude to the force exerted by said biasing means per unit of said substantially equal surface areas.

8. The regulator of claim 7 wherein said pressure differential is substantially equal in magnitude and opposite in direction to the force exerted by said biasing means per unit of said substantially equal surface areas.

9. A reduced length, pressure compensating liquid flow regulator, comprising:

(A) a poppet defining a longitudinally extending hollow cylinder having a front surface defining a front sense orifice and a rear surface defining an outwardly tapered rear orifice, said cylinder orifices defining a liquid passageway therethrough;

(B) retainer means for slidably maintaining biasing means substantially disposed within said cylinder, said retainer means including a front sidewall surface defining a central aperture and a rear sidewall surface defining rear side slots, said retainer central aperture and side slots defining a liquid passageway therethrough, and said retainer front sidewall surface forming an annular space between said cylinder rear orifice and said retainer front sidewall surface;

(C) a seat having a closed front face spaced from and facing said cylinder, side passages rearwardly of said seat front face, and a downstream passage, said seat passages defining a liquid passageway therethrough;

(D) biasing means disposed at least partially within said cylinder for biasing said cylinder rear orifice longitudinally away from said seat, said biasing means defining a liquid passageway therethrough; and (E) a hollow housing slidably receiving said cylinder and fixedly receiving said retainer means and said seat, said housing directing liquid flow from said annular space and said retainer side slots into said seat side passages;

the surface areas defined by the outer diameters of said poppet front surface and said poppet rear orifice, respectively, being substantially equal; and the pressure differential between said poppet front surface and rear orifice being substantially proportional in magnitude to the force exerted by said biasing means per unit of said substantially equal surface areas.

whereby the magnitude of the spacing between said seat front face and said cylinder rear orifice is self-adjusting as an inverse function of the magnitude of the liquid flow rate, thereby to provide a substantially constant liquid flow rate through said regulator by compensating for variations in the pressure differential across said sense orifice.

10. The regulator of claim 9 wherein the outer circumferences of said cylinder rear orifice and said cylinder front surface are substantially equal.

11. The regulator of claim 9 wherein said pressure differential is substantially equal in magnitude and opposite in direction to the force exerted by said biasing means per unit of said substantially equal surface areas.

* * * * *